(12) United States Patent
Smith et al.

(10) Patent No.: US 8,116,342 B2
(45) Date of Patent: Feb. 14, 2012

(54) VARIABLE ATTENUATOR DEVICE AND METHOD

(75) Inventors: Daniel G. Smith, Oro Valley, AZ (US);
Hirohisa Tanaka, Kumagaya (JP);
David M. Williamson, Tucson, AZ (US)

(73) Assignee: Nikon Corporation, Tokyo (JP)

( * ) Notice: Subject to any disclaimer, the term of this patent is extended or adjusted under 35 U.S.C. 154(b) by 186 days.

(21) Appl. No.: 12/052,191

(22) Filed: Mar. 20, 2008

(65) Prior Publication Data

US 2008/0240182 A1 Oct. 2, 2008

Related U.S. Application Data

(60) Provisional application No. 60/920,002, filed on Mar. 26, 2007.

(51) Int. Cl.
*H01S 3/10* (2006.01)
*H01S 3/08* (2006.01)
(52) U.S. Cl. .......................................... 372/23; 372/106
(58) Field of Classification Search .............. 372/55–57, 372/109, 23, 106; 355/67; 250/205, 492.1
See application file for complete search history.

(56) References Cited

U.S. PATENT DOCUMENTS

| 4,778,263 | A | * | 10/1988 | Foltyn ........................ 359/580 |
| 5,011,265 | A | * | 4/1991 | Tamamura et al. .......... 359/629 |
| 6,198,574 | B1 | | 3/2001 | Hill |
| 7,145,640 | B2 | | 12/2006 | Voorma et al. |
| 7,230,964 | B2 | | 6/2007 | Das et al. |

* cited by examiner

*Primary Examiner* — Patrick Stafford
(74) *Attorney, Agent, or Firm* — Lawrence R. Oremland, P.C.

(57) ABSTRACT

A new and useful attenuating device and method for attenuating a polarized laser beam is provided. At least one attenuating optic is located along, and is rotatable about, a polarized laser beam axis, and is configured to transmit and to reflect portions of the polarized laser beam. The attenuating optic provides predetermined attenuation of the polarized laser beam by changing the ratio between transmission and reflection of the polarized laser beam as a function of the incidence of the polarized laser beam on one or more partially reflective surfaces of the attenuating optic. The attenuating optic is rotatable about the polarized laser beam axis to control the incidence of the polarized laser beam on the one or more partially reflective surfaces of the attenuating optic, thereby to control the ratio between transmission and reflection of the polarized laser beam and provide a range of attenuation of the polarized laser beam.

17 Claims, 5 Drawing Sheets

Diagram of a single stage attenuating device. At each plane interface some portion of the beam is reflected. The amount reflected depends on the orientation of the attenuating optics relative to the polarized laser beam axis.

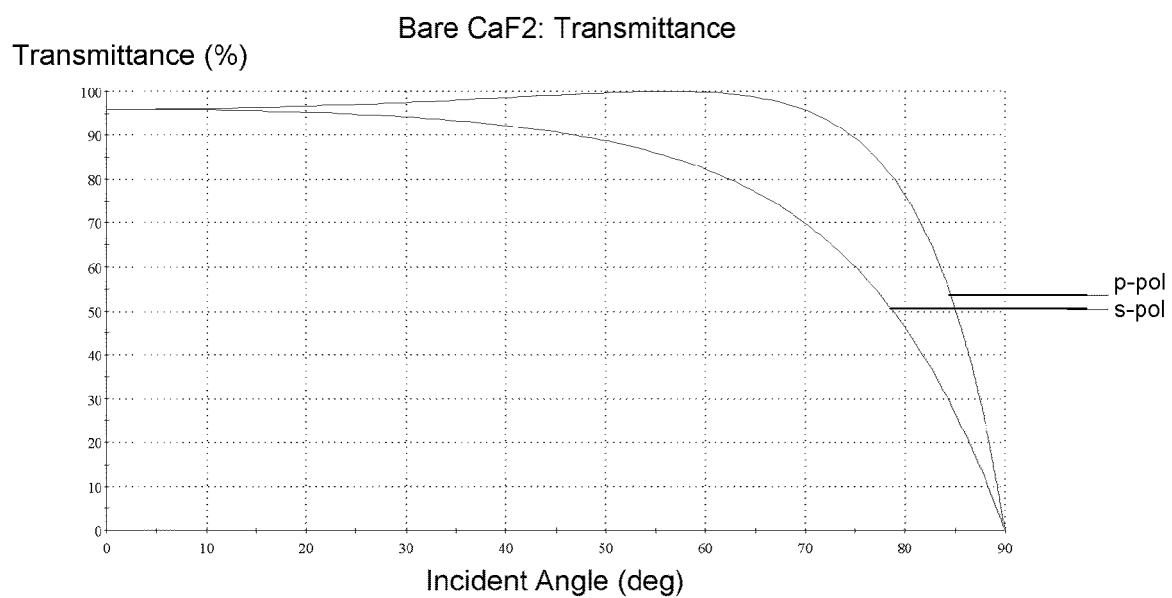
Figure 1. Polarization dependent transmittance of a bare CaF2 surface as a function of the angle of incidence at λ=193.3nm

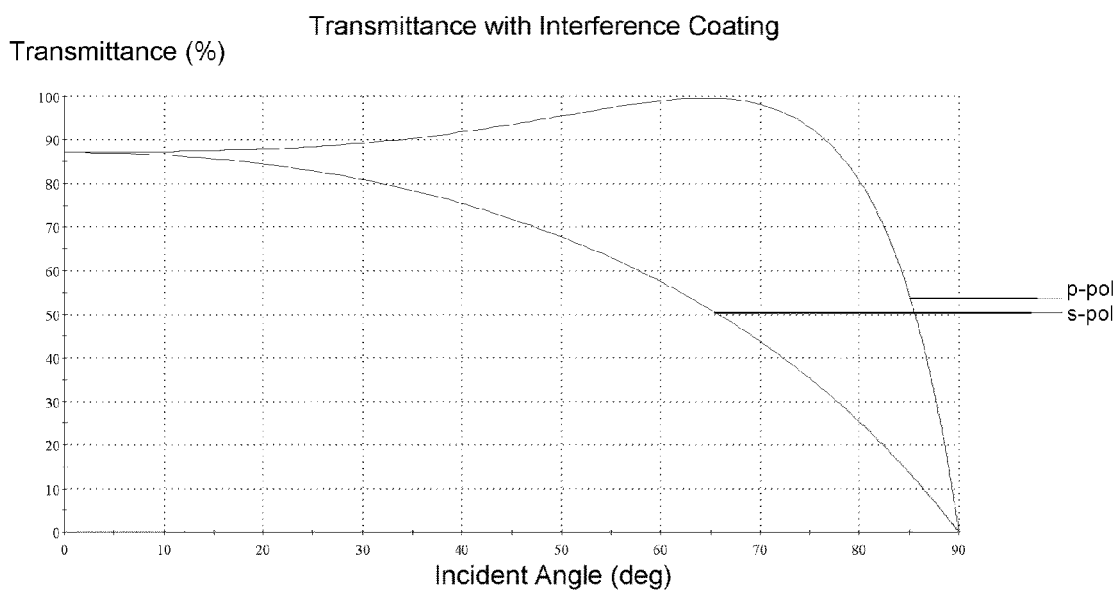
Figure 2. Polarization dependent transmittance through a specially coated CaF2 surface as a function of the angle of incidence at λ=193.3nm. This particular coating has only three layers and was designed to give nearly 100% transmittance at 65° angle of incidence for p-polarization and less than 51% transmittance for s-polarization.

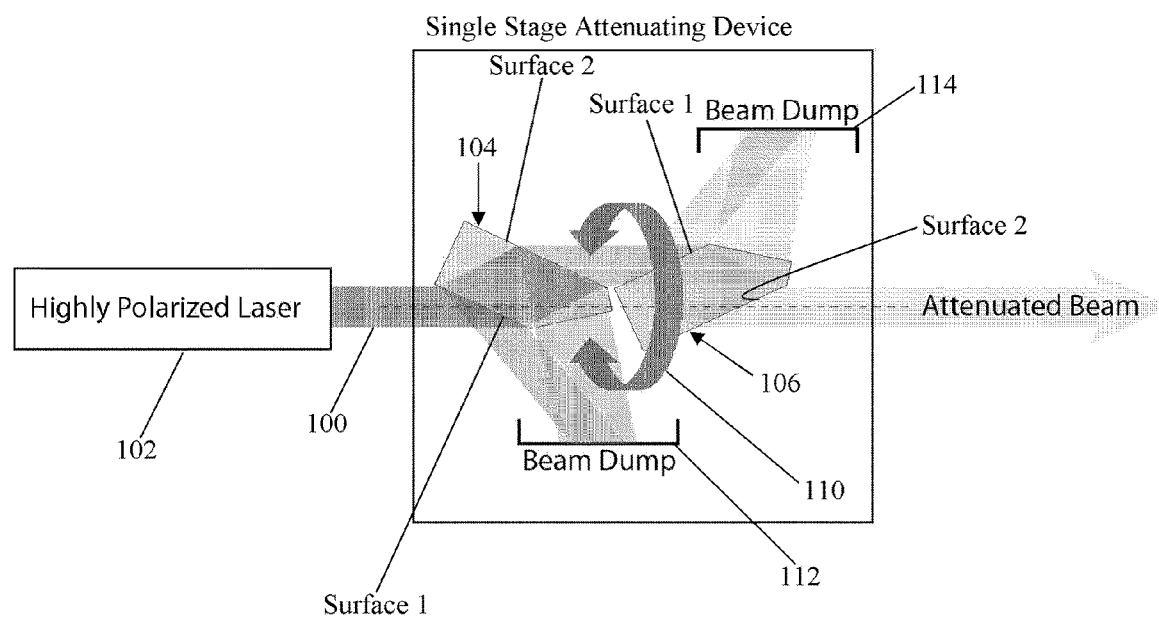
Figure 3. Diagram of a single stage attenuating device. At each plane interface some portion of the beam is reflected. The amount reflected depends on the orientation of the attenuating optics relative to the polarized laser beam axis.

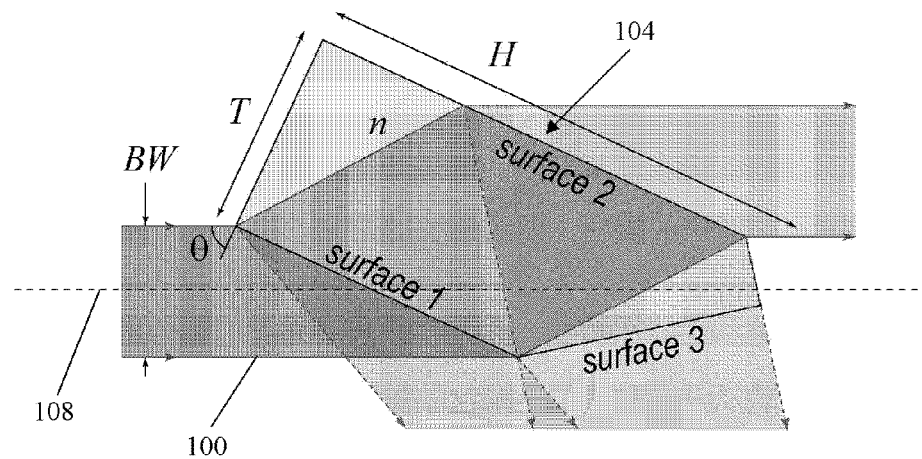
Figure 4. Diagram illustrating the geometric raytrace of a polarized laser beam by an attenuating optic.
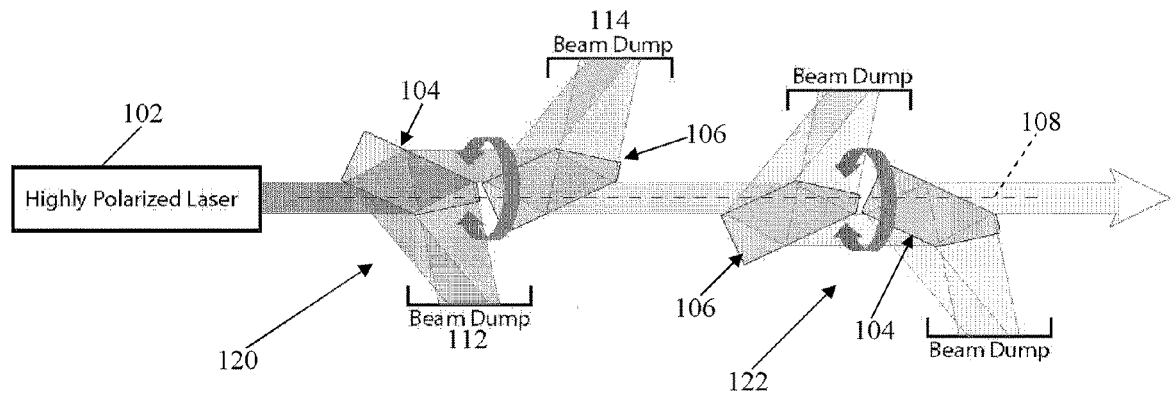
Figure 5. Diagram of a two stage attenuator.

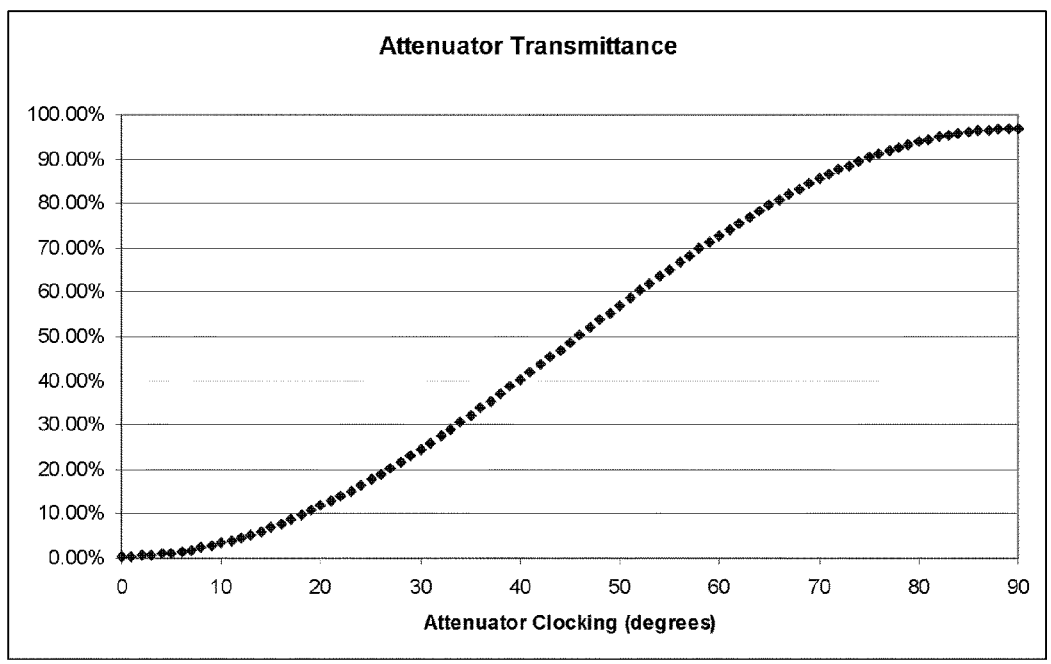
Figure 6. Total transmittance of a linearly polarized beam as a function of the angle of the attenuating optics rotation angle in a two stage attenuator with the enhanced coating of Figure 2.

VARIABLE ATTENUATOR DEVICE AND METHOD

RELATED APPLICATION/CLAIM OF PRIORITY

This application is related to and claims priority from provisional application Ser. No. 60/920,002, filed Mar. 26, 2007, which provisional application is incorporated by reference herein.

BACKGROUND

The present invention relates to a new and useful device and method for producing attenuation of a laser beam, and particularly to providing variable attenuation of a polarized laser beam.

In certain types of optical systems, it is desirable to provide attenuation of a polarized laser beam. For example, if the power of the polarized laser beam is too strong for the particular application, it is desirable to attenuate the polarized laser beam, to reduce the power of the beam that is used in the application.

In an attenuation system designed to work with very high laser power, the unused radiation from the laser is an important issue. One known way of attenuating a polarized laser beam is to absorb a percentage of the laser beam power with several ND filters on one or more turrets so that various amounts of attenuation can be achieved. With such a technique, the ND filters absorb a great deal of energy which shortens their lifetime. Additionally the finite number of filters can only produce a limited number of discrete attenuation factors.

SUMMARY OF THE PRESENT INVENTION

The present invention provides a new and useful attenuating device and method for attenuating a polarized laser beam that addresses the foregoing issues, and also addresses other issues that are often associated with an attenuating device and method. The attenuating device and method of the present invention provides attenuating optics configured to reflect most of the unneeded light to a beam dump, where the unneeded radiation can be absorbed without harming the attenuating optics, thereby extending the lifetime of the attenuating device. Moreover, the attenuating optics can be adjusted to virtually any desired rotational orientation relative to the laser beam axis, and this feature enhances the nature and range of attenuation factors that can be produced.

In accordance with the present invention, at least one attenuating optic is located along, and is rotatable about, a polarized laser beam axis, and is configured to transmit and to reflect portions of the polarized laser beam. The attenuating optic provides predetermined attenuation of the polarized laser beam by changing the ratio between transmission and reflection of the polarized laser beam as a function of the incidence of the polarized laser beam on one or more partially reflective surfaces of the attenuating optic. The attenuating optic is rotatable about the polarized laser beam axis to control the incidence of the polarized laser beam on the one or more partially reflective surfaces of the attenuating optic, thereby to control the ratio between transmission and reflection of the polarized laser beam and provide a range of attenuation of the polarized laser beam.

Preferably, the attenuating optic has first and second partially reflective surfaces, and at every rotational orientation of the attenuating optic relative to the polarized laser beam axis at least one of the first and second partially reflective surfaces is oriented to reflect a portion of the polarized laser beam in a direction that is transverse to the polarized laser beam axis. In addition, at certain rotational orientations of the attenuating optic relative to the polarized laser beam axis both of the first and second partially reflective surfaces are oriented to reflect respective portions of the polarized laser beam in directions transverse to the polarized laser beam axis, and the first and second partially reflective surfaces are oriented relative to each other such that reflection from the second surface does not re-enter the clear aperture of the first surface. Thus, the reflected light goes directly to a beam dump without producing multiple reflections which could continue along the original direction of propagation or travel back to the source.

In one specific version of the present invention, the attenuating device comprises a first pair of attenuating optics located along the polarized laser beam axis. Each of the first pair of attenuating optics is rotationally oriented relative to the polarized laser beam axis such that each of the first pair of attenuating optics transmits and reflects portions of the polarized laser beam in opposite directions, each of which is transverse to the polarized laser beam. Moreover, each of the first pair of attenuating optics have first and second partially reflective surfaces, each oriented to reflect respective portions of the polarized laser beam in directions transverse to the polarized laser beam axis, and wherein the first and second partially reflective surfaces of each of the first pair of attenuating optics are oriented relative to each other such that reflection of a portion of the polarized laser beam from the second surface does not reenter the clear aperture of the first surface.

In another specific version of the present invention, the attenuating device comprises two stages of attenuating optics, each stage of attenuating optics located along the polarized laser beam axis and comprising a pair of attenuating optics as described above. Preferably, the two stages of attenuating optics are independently rotatable about the polarized beam axis.

These and other aspects of the present invention will become further apparent from the following detailed description and the accompanying drawings.

BRIEF DESCRIPTION OF THE DRAWINGS

FIG. 1 is a diagram showing polarization dependent transmittance of a bare CaF2 surface as a function of the angle of incidence at λ=193.3 nm;

FIG. 2 is a diagram showing polarization dependent transmittance through a coated CaF2 surface as a function of the angle of incidence at λ=193.3 nm;

FIG. 3 is a schematic illustration of an attenuating device with a pair of attenuating optics, according to the principles of the present invention;

FIG. 4 is a schematic geometric raytrace for an attenuating optic that can be used in an attenuating device according to the principles of the present invention;

FIG. 5 is a schematic illustration of a two stage attenuating device containing four attenuating optics, according to the principles of the present invention; and FIG. 6 is a diagram showing total transmittance of a linearly polarized beam as a function of the angle of the attenuating optic rotation angle.

DETAILED DESCRIPTION

As described above, the present invention provides an attenuating device and method in which one or more attenuating optics provide reflection and/or transmittance of a polarized laser beam, to reflect unneeded laser light to beam dumps.

Initially, it is believed useful to note that the device and method of the present invention are partly based on the idea that the transmittance of a plane interface is different for p-polarization and s-polarization. This principle is illustrated for a bare Calcium Fluoride (CaF2) surface in FIG. 1, and it is possible to enhance this effect with interference coatings as shown in FIG. 2. According to the present invention, an interference coating that can be used with a Calcium Fluoride optic, to provide reflection of a portion of a polarized laser beam, would have the following composition:

Incident medium—Air
34.20 nm of LaF3 (n=1.701,k=0.0008)
52.25 nm of AlF3 (n=1.390,k=0.0003)
6.27 nm of LaF3 (n=1.701, k=0.0008)

This coating has three layers and, as seen in FIG. 2, is designed to give nearly 100% transmittance at 65° angle of incidence for p-polarization and less than 51% transmittance for s-polarization.

FIGS. 3 and 4 illustrate a single stage attenuating device and method in accordance with the principles of the present invention. As shown in FIG. 3, a beam 100 from a highly polarized laser 102 is attenuated by a pair of attenuating optics 104, 106, each of which attenuates the laser beam 100 in accordance with the principles of the present invention. Each attenuating optic has the characteristics of the optic 104 shown in FIG. 4. The attenuating optic 104 is located along a polarized laser beam axis 108. The optic 104 is configured to transmit and to reflect portions of the polarized laser beam 100 (having a beam width BW, as shown in FIG. 4), and provide predetermined attenuation of the polarized laser beam by changing the ratio between transmission and reflection of the polarized laser beam as a function of the incidence of the polarized laser beam on one or more partially reflective surfaces of the attenuating optic. The partially reflective surfaces are shown in FIG. 4 as surface 1 and surface 2, and comprise substantially plane surfaces.

The attenuating optics 104, 106 are rotatable about the polarized laser beam axis 108; i.e. the optics 104, 106 are rotatable an axis that is parallel to, or co-incident with, the polarized laser beam axis 108 (as schematically illustrated by the arrows 110 in FIG. 3). The rotational orientation of the attenuating optics 104, 106 about the polarized laser beam axis determines the incidence of the polarized laser beam on the partially reflective surfaces 1 and 2 of each of the attenuating optics 104, 106, and thereby controls the ratio between transmission and reflection of the polarized laser beam and provides a range of attenuation of the polarized laser beam. Because the attenuating optics 104, 106, can be rotated to virtually any rotational orientation about the polarized laser beam axis 108, the nature and range of attenuation that can be produced by the optics are enhanced.

Preferably, each of the attenuating optics 104, 106 has both partially reflective surfaces 1 and 2, and at every rotational orientation of the attenuating optics 104, 106 about the polarized laser beam axis 108, at least one of the partially reflective surfaces 1 and 2 is oriented to reflect a portion of the polarized laser beam in a direction that is transverse to the polarized laser beam axis. In the application, reference to a polarized laser beam being reflected in a direction that is "transverse" to the polarized laser beam axis 108 means that the reflected beam has a component that is normal to the polarized laser beam axis 108. The amount of the beam reflected by the attenuating optic depends on the orientation of the attenuating optic relative to the polarized laser beam axis 108.

Preferably, the partially reflective surfaces 1 and 2 are oriented relative to each other such that reflection from the surface 2 does not re-enter the clear aperture of surface 1. As shown in FIG. 4, reflection from surface 2 (which exits the attenuating optic 104 through surface 3) does not re-enter the clear aperture of surface 1 (i.e. any overlap of reflections from surfaces 1 and 2 occurs outside the clear aperture of surface 1). Thus, the reflected light goes directly to a beam dump 112 without producing multiple reflections which could continue along the original direction of propagation or travel back to the source. It is preferred that the length H and thickness T of the optic 104 are designed to be as small as reasonably possible, and still provide the foregoing characteristics.

In the version of the present invention shown in FIG. 3, the attenuating optics 104, 106 comprise a pair of attenuating optics. Each of the pair of attenuating optics 104, 106 is rotationally oriented about the polarized laser beam axis 108 such that each of the pair of attenuating optics transmits portions of the polarized laser beam, and reflects portions of the polarized laser beam to a respective beam dump 112, 114. Moreover, each of the pair of attenuating optics 104, 106 has a pair of partially reflective surfaces (similar to surfaces 1 and 2 of FIG. 4), each oriented to reflect respective portions of the polarized laser beam to the beam dumps 112, 114, in opposite directions (transverse to the polarized laser beam axis 108), and the pair of partially reflective surfaces of each of the attenuating optics 104, 106, are oriented relative to each other such that reflection of a portion of the polarized laser beam from surface 2 does not reenter the clear aperture of the surface 1.

Another version of the present invention is shown in FIG. 5. In that version, the attenuating device comprises two stages 120, 122 of attenuating optics, each stage of attenuating optics located along the polarized laser beam axis 108 and comprising a pair of attenuating optics that are similar to the pair of attenuating optics 104, 106 described above. One stage 122 of the attenuating optics is shown in FIG. 5 to be rotationally oriented 180° to the other stage 120 of attenuating optics. Preferably, the two stages of attenuating optics are independently rotatable about the polarized beam axis 108.

In the practice of the present invention, the transmittance of a plane interface is different for p-polarization and s-polarization. Thus, depending on the application, the beam polarization may need to be changed between p- and s-polarization. This could be accomplished by rotating the input polarization with, for example, a half wave plate, or by simply rotating the optic while keeping the angle of incidence fixed (in FIG. 4 the angle of incidence is shown at $\theta$). The use of a pair of attenuating optics 104, 106, as shown in FIG. 3, where the optic 106 is oriented in the opposite direction as the optic 104, and the reflection of polarized laser light by the optics 104, 106, is in opposite directions to the beam dumps 112, 114, also addresses the issue that a polarized laser beam would be sheared laterally if reflected from a single optic.

As shown in FIG. 4, the attenuating optic 104 is designed so that the portion of the beam reflected from the surface 2 does not re-enter the clear aperture of the reflection from surface 1 (i.e. the portion of the beam reflected from the surface 2 only overlaps the portion of the beam reflected from surface 1 below the input beam 100). The angle of incidence on surface three can be made to be 90° which enables the application of an anti-reflection coating at surface three of attenuating optics 104, 106 that works for any polarization incident on surface 1. However, it may be desirable to make the angle of incidence of the polarized laser beam at surface 3 different from 90° so that any erroneous reflected component cannot propagate back to the source. The reflections from the surfaces 1 and 2, are sent directly to the beam dumps 112, 114 which can be similar to each other.

In the case of minimum optic volume and normal incidence at surface 3 of the attenuating optic 104, the attenuating optic thickness T and length H (parallel to the surfaces 1 and 2) are given by equations (1) and (2), below, where n is the refractive index of the optic. In practice, somewhat larger dimensions may be needed for clearance, but based on these formulae for a 20 mm beam diameter at 65° angle of incidence, a CaF2 prism will need to be at least 33.3 mm thick and 77.4 mm long.

$$T = BW \cdot \frac{\sqrt{n^2 - \sin^2\theta}}{\sin 2\theta} \quad (1)$$

$$H = BW \cdot \frac{2 - \frac{1}{n^2}\sin^2\theta}{\cos\theta} \quad (2)$$

The multistage attenuating device shown in FIG. 5 provides even greater attenuation than the single stage attenuating device of FIG. 3. With the 51% minimum transmittance coating of FIG. 2, a two stage attenuating device (based on the principles of FIG. 5) will transmit less than 0.5% of s-polarization, while that particular coating will transmit more than 96% of p-polarization. Other coatings may be expected to perform even better.

The transmittance of a two stage system like that shown in FIG. 5 is shown in FIG. 6, where the glass is CaF2 and each partially reflective surface is provided with the coating of FIG. 2. In this case the angle of incidence is 65° and both stages are rotated together. However, the stages 120, 122 can be rotated independently of each other. When both stages are rotated together, the polarization may not be preserved, but the multi-stage system allows for control of this effect by enabling the stages to be rotated independently. This feature can be used for fine polarization control.

An additional issue that is not included in the data of FIG. 6 is intrinsic birefringence, or more generally, the birefringence of whatever glass is chosen for the attenuating optics. However, it is possible to compensate for this in a variety of ways. One possibility is to make the thickness of the optics such that it gives the beam an integer number of waves of retardance. Another approach is to orient the crystal axes of the successive optics to compensate. A third approach is to insert compensating retarders. Any combination of these or other techniques can aid in the control of polarization effects.

The attenuating device and method of the present invention are specifically designed to produce new and useful effects. Specifically, a. Whereas ND filters, for attenuation, absorb a great deal of energy which shortens their lifetime, the attenuating device of the present invention comprises coated glass reflecting optics, designed to significantly enhance the life of the attenuating device.

b. Whereas a finite number of ND filters can only produce a limited number of discrete attenuation factors, the rotatable partially reflective optics of the present invention provide a virtually unlimited range of attenuation factors.

c. The attenuation device and method of the present invention can be configured to send most of the unneeded light away from the source and to a beam dump that can be designed to efficiently absorb the unneeded radiation without harming the optics, thereby preventing feedback to the laser and extending the lifetime of the attenuator.

The attenuating device and method described herein can produce a continuous variation in attenuation factor with very high maximum transmittance to very high maximum attenuation. In the examples shown and described, the coating may not be optimal and it is believed that much higher transmittance than 96% is possible, while in principle the minimum transmittance can be made as low as desired with improved coatings and additional stages. Adding an additional strong ND filter that can be inserted before or after the variable attenuator is one way to produce very low transmittance without resorting to many stages.

The attenuating optic coatings can be quite simple with five or fewer layers. This has the advantage of high durability. Adding an additional strong ND filter before or after the variable attenuator (while it is set for low transmittance) may also allow the coatings to be even simpler and more durable with enhanced maximum transmission.

An attenuating device, as described herein, can be quite compact, and has as few as one axis of motion. This has the advantage of simplifying the mechanical design. Furthermore, the attenuating device and method are insensitive to misalignment since the attenuating optics don't deviate the beam in angle and beam shear is compensated by counter-tilting the attenuating optic pairs that form each stage.

Finally, with two independently rotating stages, polarization compensation and control is possible. This may be especially desirable if the polarization of the input beam is known to drift.

Accordingly, the foregoing description provides attenuating device and method principles designed to effectively attenuate a highly polarized laser beam, while addressing issues that have been identified with prior attenuating devices and methods. With the foregoing disclosure in mind, the manner in which the principles of the present invention can be used to produce various versions of attenuating devices and methods will be apparent to those in the art.

The invention claimed is:

1. An attenuating device for attenuating a polarized laser beam, comprising
   a. at least one attenuating optic located along a polarized laser beam axis, where the polarized laser beam axis is defined as parallel to the propagation of the laser beam,
   b. the attenuating optic configured to transmit and to reflect portions of the polarized laser beam, and provide predetermined attenuation of the polarized laser beam by changing the ratio between transmission and reflection of the polarized laser beam as a function of the incidence of the polarized laser beam on one or more partially reflective surfaces of the attenuating optic, and
   c. the attenuating optic being rotatable about the polarized laser beam axis to control the incidence of the polarized laser beam on the one or more partially reflective surfaces of the attenuating optic, thereby to control the ratio between transmission and reflection of the polarized laser beam and provide a range of attenuation of the polarized laser beam.

2. The attenuating device according to claim 1, wherein at every rotational orientation of the attenuating optic about the polarized laser beam axis at least one of the first and second partially reflective surfaces is oriented to reflect a portion of the polarized laser beam in a direction that is transverse to the polarized laser beam axis.

3. The attenuating device according to claim 2, wherein at certain rotational orientations of the attenuating optic about the polarized laser beam axis both of the first and second partially reflective surfaces are oriented to reflect respective portions of the polarized laser beam in directions transverse to the polarized laser beam axis, and the first and second partially reflective surfaces are oriented relative to each other such that reflection from the second surface does not re-enter the clear aperture of the first surface.

4. The attenuating device according to claim 1, wherein the attenuating device comprises a first pair of attenuating optics located along and rotatable about the polarized laser beam axis, and wherein each of the first pair of attenuating optics is rotationally oriented relative to the polarized laser beam axis such that each of the first pair of attenuating optics transmits and reflects portions of the polarized laser beam.

5. The attenuation device according to claim 4, wherein each of the first pair of attenuating optics is rotationally oriented relative to the polarized laser beam axis such that each of the first pair of attenuating optics reflects portions of the polarized laser beam in different directions, each of which is transverse to the polarized laser beam.

6. The attenuating device according to claim 5, wherein each of the first pair of attenuating optics have first and second partially reflective surfaces, each oriented to reflect respective portions of the polarized laser beam in directions transverse to the polarized laser beam axis, and wherein the first and second partially reflective surfaces of each of the first pair of attenuating optics are oriented relative to each other such that reflection of a portion of the polarized laser beam from the second surface does not reenter the clear aperture of the first surface.

7. The attenuating device according to claim 6, wherein the attenuating device comprises two stages of attenuating optics, each stage of attenuating optics located along and rotatable about the polarized laser beam axis and comprising a pair of attenuating optics as defined in claim 6.

8. The attenuating device according to claim 7, wherein the two stages of attenuating optics are independently rotatable relative to the polarized beam axis.

9. A method of attenuating a polarized laser beam, comprising
   a. providing at least one attenuating optic located along and rotatable about the polarized laser beam axis, where the polarized laser beam axis is defined as parallel to the propagation of the laser beam, the attenuating optic configured to transmit and reflect portions of the polarized laser beam, and provide predetermined attenuation of the polarized laser beam by changing the ratio between transmission and reflection of the polarized laser beam as a function of the incidence of the polarized laser beam on one or more partially reflective surfaces of the attenuating optic, and
   b. rotating the attenuating optic to a predetermined rotational orientation relative to the polarized laser beam axis to control the incidence of the polarized laser beam on the one or more partially reflective surfaces of the attenuating optic, thereby to control the ratio between transmission and reflection of the polarized laser beam and provide a range of attenuation of the polarized laser beam.

10. The method of attenuating a polarized laser beam according to claim 9, wherein the step of rotating the attenuating optic comprises rotating the attenuating optic to a predetermined rotational orientation about the polarized laser beam axis.

11. The method of attenuating a polarized laser beam according to claim 9, wherein the attenuating optic includes first and second reflecting surfaces, and the step of rotating the attenuating optic relative to the polarized laser beam axis comprises rotationally orienting the attenuating optic such that at least one of the first and second partially reflective surfaces is oriented to reflect a portion of the polarized laser beam in a direction that is transverse to the polarized laser beam axis.

12. The method of attenuating a polarized laser beam according to claim 11, wherein the step of rotating the attenuating optic relative to the polarized laser beam axis comprises rotating the attenuating optic to a rotational orientation relative to the polarized laser beam axis where both of the first and second partially reflective surfaces are oriented to reflect respective portions of the polarized laser beam in directions transverse to the polarized laser beam axis, and the first and second partially reflective surfaces are oriented relative to each other such that reflection of a portion of the polarized laser beam from the second surface does not interfere with reflection of a portion of the polarized laser beam from the first surface within the attenuating optic.

13. The method of attenuating a polarized laser beam according to claim 9, wherein the step of providing comprises providing a first pair of attenuating optics located along and rotatable about the polarized laser beam axis, and the step of rotating comprises rotating the first pair of attenuating optics to a rotational orientation relative to the polarized laser axis such that each of the attenuating optics of the first pair reflects portions of the polarized laser beam.

14. The method of attenuating a polarized laser beam according to claim 13, wherein each of the first pair of attenuating optics comprises first and second partially reflective surfaces and the step of rotating comprises rotating the first pair of attenuating optics to a rotational orientation where each of the first pair of attenuating optics is rotationally oriented relative to the polarized laser beam axis such that each of the first pair of attenuating optics reflect portions of the polarized laser beam in different directions, each of which is transverse to the polarized laser beam.

15. The method of attenuating a polarized laser beam according to claim 14, wherein the step of rotating the attenuating optic relative to the polarized laser beam axis comprises rotating the first pair of attenuating optics to rotational orientations relative to the polarized laser beam axis where both of the first and second partially reflective surfaces of each pair of attenuating optics are oriented to reflect respective portions of the polarized laser beam in directions transverse to the polarized laser beam axis, and the first and second partially reflective surfaces of each pair of attenuating optics are oriented relative to each other such that reflection of a portion of the polarized laser beam from the second surface does not re-enter the clear aperture of the first surface.

16. The method of attenuating a polarized laser beam according to claim 15, wherein the attenuating device comprises two stages of attenuating optics, each stage of attenuating optics located along and rotatable about the polarized laser beam axis and comprising a pair of optics as defined in claim 15, and wherein the step of rotating comprises rotating either or both of the first and second stages of attenuating optics to a respective rotational orientation relative to the polarized laser axis.

17. The method of attenuation a polarized laser beam according to claim 16, wherein the step of rotating comprises rotating the two stages of attenuating optics independently to respective rotational orientations relative to the polarized beam axis.

* * * * *